3,014,994
EYEGLASS HEARING AID CONSTRUCTION
Sam Posen, Chicago, Ill., assignor to Beltone Hearing Aid Company, Chicago, Ill., a corporation of Illinois
Filed Mar. 17, 1959, Ser. No. 800,051
12 Claims. (Cl. 179—107)

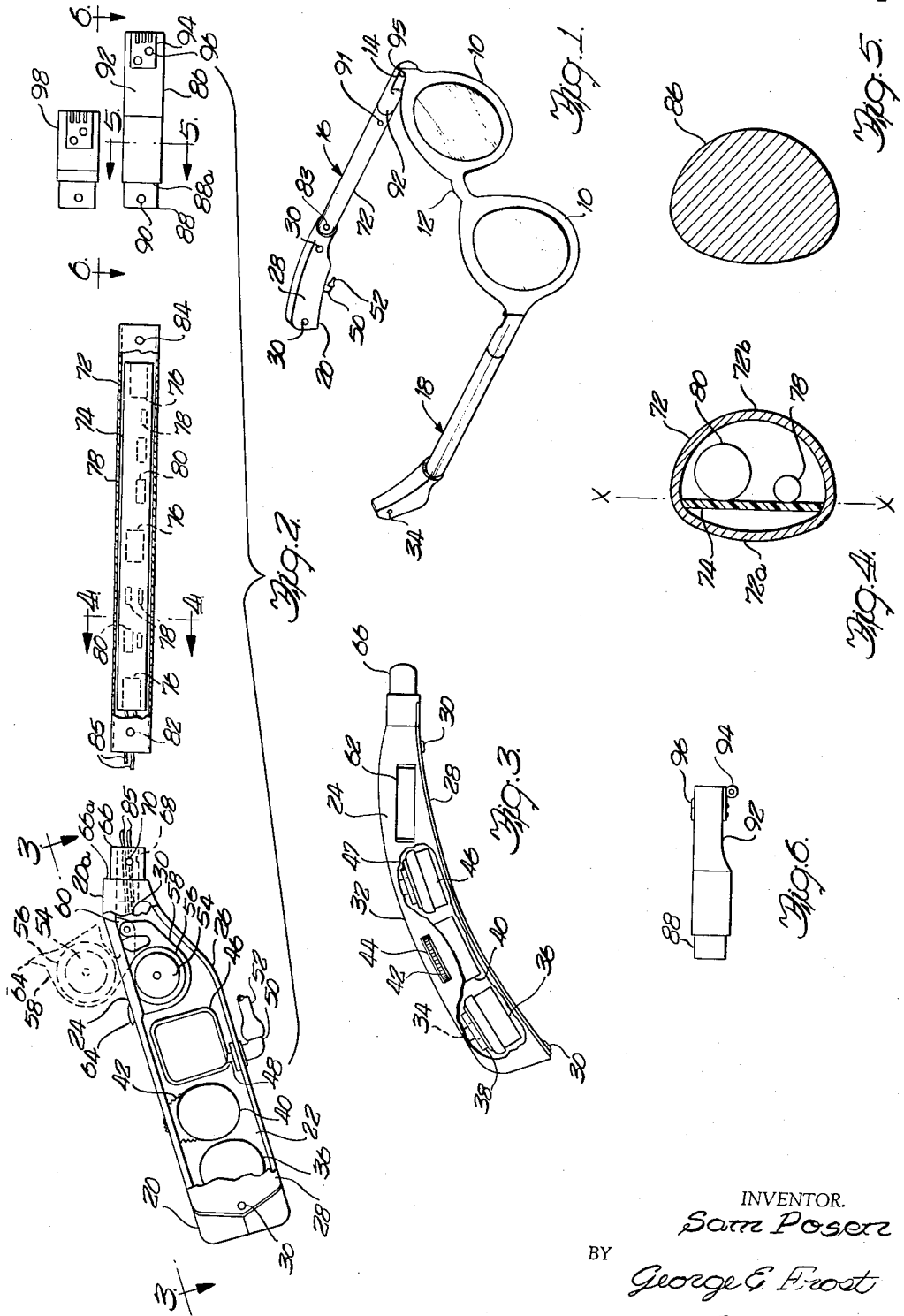

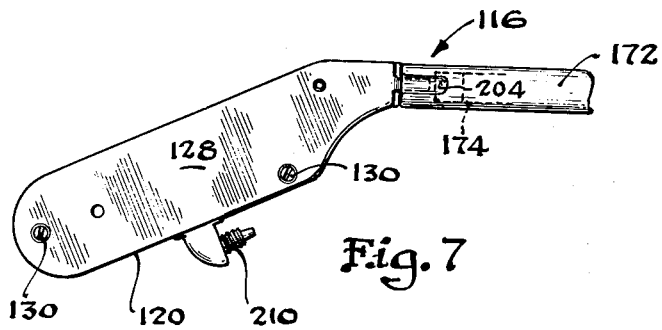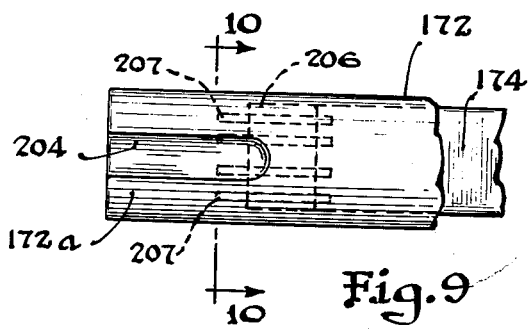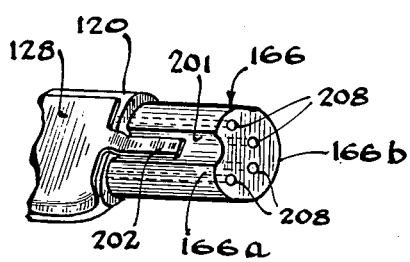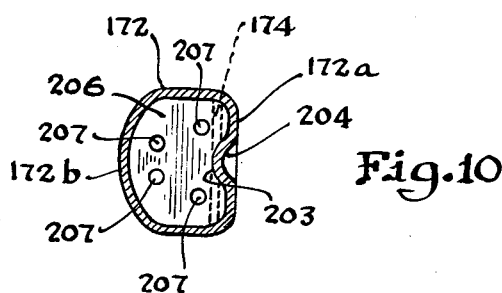
Inventor
Sam Posen
By Frost & Vandenburgh
Attorneys United States Patent Office 3,014,994
Patented Dec. 26, 1961

This invention relates to an eyeglass hearing aid having compact temple members of sound, rigid construction, which is adapted for quick and inexpensive conversion to custom fitting length for the intended wearer.

It is important, in any pair of eyeglasses, that the temple members fit snugly over and behind the ears of the wearer to hold the glasses firmly in place on the bridge of the nose. In order to achieve this snug fit the temple members must either be constructed in a large variety of lengths or be adapted to be shaped to fit the head of the particular intended wearer. In ordinary eyeglasses the problem is not acute since the temple members can usually be bent easily to the desired shape for a proper fit.

It is evident that in an eyeglass hearing aid of the type carrying components in at least one of the temple members, the members can not be bent to fit the particular user. On the other hand, if the temple members are manufactured in a wide variety of sizes production costs are increased considerably and inventory problems are introduced, not only for the manufacturer, but also for all the dealers.

It is also important in any eyeglass hearing aid for the temple member carrying the hearing aid components to be strong and rigid, as well as compact, and yet afford easy access to all parts of the unit for repair or replacement.

In the present invention an eyeglass hearing aid construction is provided which can quickly be adapted to fit the intended user. At the same time the major portion of the unit can be manufactured in one, or a relatively few, standard sizes. In the construction of the present invention a strong, rigid, compact unit is provided which permits quick access for replacement or repair of all the hearing aid components carried in the temple members.

In brief, the eyeglass hearing aid of the present invention has a temple member consisting of a rear portion, a forward portion, and an extension member. The rear portion has a cavity in which the microphone, volume control, receiver, and battery are compactly carried. The rear portion has a detachable cover for quick and easy access to the components carried in the cavity. The forward portion is made of an elongated tubular member, shaped to receive snugly a chassis carrying transistors, resistors, and condensers. The forward section attaches rigidly to the rear portion and an opening permits internal connection of wires leading from the forward section to the rear portion. The extension member, which may be of any length, is rigidly, but removably, attached to the end of the forward section opposite the rear portion. The end of the extension member opposite the forward section is adapted to connect detachably to the side of the eyeglass frame. The extension member carries none of the components of the hearing aid and is relatively small and of simple construction in relation to the other parts of the temple member. The extension member may be inexpensively produced and stocked in a large variety of lengths.

When assembled, the parts of the temple member combine to form a compact, rigid, snug custom fitting temple member which is of the proper length for the individual user. A wide variety of the small, inexpensive, removable, extension members can be stocked by individual dealers to assure that each individual can be properly fitted.

It is therefore a general object of the present invention to provide a rigid, compact eyeglass hearing aid with a temple member which can be easily altered in length to fit the individual user.

It is another object of the present invention to provide a rigid, compact, eyeglass hearing aid with a temple member having component carrying parts of standard size which can be altered in length by an inexpensive extension member to fit the individual user.

It is still another object of the present invention to provide a unitary, non-circular tubular forward temple section which comfortably bears against the wearer's head and compactly carries a removable hearing aid component panel.

It is yet another object of the present invention to provide a rigid compact temple member for an eyeglass hearing aid which can be easily altered to fit the individual user, and which carries the components of the hearing aid to be easily accessible for replacement and repair.

The novel features which I believe to be characteristic of my invention are set forth with particularity in the appended claims. My invention itself, however, both as to its organization and method of operation, together with further objects and advantages thereof, will best be understood by reference to the following description taken in conjunction with the accompanying drawings in which:

FIGURE 1 is a view in perspective of the eyeglass hearing aid of the present invention;

FIGURE 2 is an exploded elevational view, looking toward the inner surface, of one of the temple members of the eyeglass hearing aid of FIGURE 1;

FIGURE 3 is a view through section 3—3 of FIGURE 2;

FIGURE 4 is a view through section 4—4 of FIGURE 2;

FIGURE 5 is a view through section 5—5 of FIGURE 2;

FIGURE 6 is a view through section 6—6 of FIGURE 2;

FIGURE 7 is an elevation of a portion of a temple member illustrating an alternative embodiment;

FIGURE 8 is an enlarged perspective view of an end of the rear portion of the temple member of FIGURE 7;

FIGURE 9 is an enlarged elevation of the corresponding end of the forward temple section of FIGURE 7; and FIGURE 10 is a view through section 10—10 of FIGURE 9.

The present application is a continuation-in-part of my prior application Serial No. 638,726, filed February 7, 1957, now abandoned.

The eyeglass hearing aid of the present invention is shown in FIGURE 1. A pair of lens-receiving frames 10 are connected by a nosebridge 12. Each of the frames 10 has, at its outboard edge, a hinge part. A pair of temple members generally 16 and 18 are connected, respectively to the hinge part by hinge part 94. At least one of the temple members contains all the necessary components of a hearing aid. If the user so desires each of the temple members 16 and 18 can carry a complete hearing aid unit. On the other hand, if the user so desires, the temple member adjacent one ear wi'l have a complete hearing aid unit while the other temple member will be a dummy. In the following description only temple member 16 is described, it being understood that the temple member 18 can be similarly constructed.

As shown in FIGURE 2 the temple member 16 consists of a rear portion 20, a forward temple section 72, and an extension member 92. The rear portion 20, which may be made of plastic material, has an upper wall 24, a lower wall 26, and an outer wall 32, which define a cavity 22 in which components of the hearing aid are located.

The rear portion 20 also has a detachable cover 28 defining an inner wall which can be readily removed for access to the components. Screws 30, which are threadedly received in threaded holes (not shown) in the rear portion, hold the removable cover in place.

The rear portion 20 of the temple member slopes downwardly, when the eyeglass hearing aid is worn, except for a small neck portion 20a at the forward end of the portion 20, which is horizontal. The lower wall 26 of the rear portion curves upwardly to the neck portion to fit snugly behind the ear of the wearer. As shown best in FIGURE 3 the rear portion also curves inwardly towards the rear to firmly and snugly embrace the head of the wearer.

The microphone 36 is located in the rear of the cavity 22 as shown in FIGURES 2 and 3. The microphone is mounted adjacent a hole 34 in the outer wall 32 and is supported by an annular rubber ring 38 encircling the hole 34 and attached to the outer wall 32. The annular ring 38 and the hole 34 define a sound passage for the microphone 36.

The volume control 40 has a control disc 42 which extends through an opening 44 in the upper wall 24 of the rear portion. A receiver 46 is mounted forward of the volume control 40. The receiver is mounted on an annular rubber ring 47 secured to the outer wall 32. The receiver has a sound opening (not shown) connected by tube 48 to a fitting 50 which extends through the lower wall 26 of the rear portion. The sound tube 52 is connected to the fitting 50 and leads to an ear piece (not shown). At the forward end of the rear portion 20 the battery 54 is mounted. The battery 54 is carried in the circular frame 56. The circular frame 56, in turn, is carried by the swingable arm 58. The arm 58 is pivotally connected to an ear 60 depending from the inner surface of the top wall 24. With this construction the battery is held in a drawer swingable from a retracted position within the rear portion 20, as shown in solid lines in FIGURE 2, through an opening 62 in the upper wall 24, to an extended position outside the rear portion as shown in the dotted lines of FIGURE 2. The arm 58 has a tab 64 which extends through the opening 62 to engage the upper surface of the wall 24 when the battery is in the retracted position within the rear portion. This tab can be engaged by the fingernail of the user to slip the battery to its external extended position for removal and replacement. A stud 66 extends from the forward end of the rear portion 20, forming a shoulder 66a where it joins the rear portion. The stud has a threaded hole 70 extending laterally therethrough. A longitudinal opening 68 extends through the stud into the cavity 22 of the rear portion.

The forward temple section 72, which may be made of aluminum, is adapted to engage telescopically the stud 66 of the rear portion 20. The forward temple section 72, which is tubular, has a hole 82 extending laterally through the walls at the rear end adapted to align with the threaded hole 70 in the stud when the end of the forward temple section 72 abuts against the shoulder 66a of the rear portion. The hole 82 and the threaded hole 70 receive a screw 83 (see FIGURE 1) to securely hold the forward temple section and rear portion together. Alternately, the forward temple section can be glued to the stud 66, in which case holes 70 and 82 need not be provided. At the forward end of the temple section 72 a similar hole 84 passes laterally through the wall. The panel 74 is slideably received within the temple section 72 as shown in FIGURES 2 and 4. The forward temple section carries a plurality of components of the hearing aid including transistors 76, resistors 78, and condensers 80. Preferably the tubular section 72 has a cross section with a generally semi-circular segment 72b and a flattened segment 72a as shown in FIGURE 4. The flattened segment 72a constitutes the inner face of the forward temple section 72 and lies against the user's head when the eyeglass hearing aid is worn. It will be noted from FIGURE 4 how suitable this particular cross section is. The forward temple section must fit comfortably against the user's head, must be as small as possible, and at the same time house components of the hearing aid. Also the components of the hearing aid housed within the rigid section 72 should be readily removable for replacement and repair. The panel or chassis 74 is slideably received within the tubular section 72 adjacent the greatest span of that member. The components are carried on the chassis to lie in the semi-circular portion 72b of the forward temple section while no components are carried on the side adjacent the flattened portion 72a. Thus the components can be conveniently carried in a section of minimum size which, at the same time, will bear comfortably against the head of the user.

Electrical connectors 85 may pass from the forward temple section 72 to the rear portion cavity 22 through the opening 68 in the stud to connect components of the hearing aid housed in the rear portion to components carried on the chassis. It should be noted that if the forward temple section is detachably connected to the rear portion by screws the chassis 74 can be removed through the rear opening of the forward temple section, without detachment of the electrical connectors 85. On the other hand if the forward temple section is permanently connected to the rear portion 20 the electrical connectors 85 can be readily detached from the components in the rear portion, because of the detachable cover, and the chassis can be removed from the forward temple section through its forward end.

The forward temple section 72 is adapted at its forward end to receive telescopically any one of a plurality of extension members, two of which, 92 and 98, are shown in FIGURE 2. The extension member 92, which may also be made of aluminum, has a body portion 86 and a stud 88 extending from the rear end of the body portion. A shoulder 88a is formed where the stud 88 joins the body section 86. The stud has a threaded hole 90 extending laterally therethrough which aligns with the hole 84 at the forward end of the forward temple section 72 when the forward temple abuts against the shoulder 88a. The forward temple section and the extension member are detachably connected by a screw 91 (see FIGURE 1). As shown in FIGURE 5 the body section 86 may have the same general cross section as the panel section 72. The forward end of the body section 86 is cut away at its inner face, as shown best in FIGURE 6, to receive a hinge part 94 which is connected to the body section 86 by rivets 96. The hinge part 94 detachably connects to the hinge part 14 on the eyeglass frame 10 by a screw 95 (see FIGURE 1).

The extension member 98 is identical to the extension member 92 except that it is shorter in length. It is evident that this member can be quickly and easily substituted for the extension member 92 when it is necessary to shorten the eyeglass temple member to custom fit the particular wearer. Similarly a plurality of like extension members differing only in length can be stocked to make the eyeglass hearing aid adjustable to fit the head of any intended user. These extension members are relatively small in size, and relatively inexpensive to manufacture and store.

Thus a hearing aid is provided which can be quickly adapted to fit any intended wearer. At the same time the major portion of the hearing aid temple member can be made in one, or a relatively few, standard sizes. The telescopic connection of the parts of the temple member give the member rigidity and strength. The tubular construction of the forward temple section also contributes to the strength of the unit. At the same time the forward temple section houses components of the hearing aid and yet is small, compact, and fits comfortably against the wearer's head.

It will be noted that the elongated tubular forward temple section 72 has a neutral axis indicated at X—X, FIGURE 4. Outboard this neutral axis the contour 72b is essentially semi-circular in cross-section. Inboard this neutral axis the contour 72a is flattened. It should be further noted that the chassis 74 is located substantially on the neutral axis X—X and since any substantial tilt from this axis would bind the chassis or panel 74—the tubular member 72 cooperates with the chassis 74 to hold the latter in vertical orientation. The hearing aid parts 78, 76, and 80 which are affixed to the chassis 74 are located on the outboard side of that chassis where the semi-circular contour 72b provides ample space.

The above construction is particularly attractive inasmuch as the tubes defining the forward temple sections 72 may be of comparatively small size giving the appearance of a conventional pair of eye glasses while the rear parts 20 may be of attractive plastic material likewise giving the appearance of a conventional pair of eye glasses. The net effect is to provide the wearer with binaural amplified hearing in a manner that is not noticeable to other persons and hence particularly desired by the usually self-conscious persons whose hearing is impaired.

The construction of the temple member makes possible quick and easy access to all components of the hearing aid without sacrificing strength, compactness, or comfort in wear. The detachable cover on the rear portion makes all the components housed therein readily accessible for repair or replacement. Similarly all the components in the forward section can be quickly made accessible by removal of the slideable chassis.

The hearing aid of the present invention is suitable for any one of several constructions, as preferred by the manufacturer. For example, a resin or other potting compound may be placed in the tubes 72 to rigidly sustain the parts and protect them against moisture. In this instance, the tube 72 is removably secured to member 26, as by set screw 83, FIGURE 1, so that the tube 72 can be replaced as a unit when desired. Alternatively, the tube 72 can be permanently secured to member 26 and the chassis 74 slideably placed in the tube 72. In this case the wires 85 are received through the bore 68 to be soldered or otherwise secured to the electrical parts contained in the member 20.

The forward temple sections 72, FIGURE 1, may be of any suitable metal defining the forward chassis sections. Preferably they are of aluminum, since this metal is not only light in weight but in addition can be anodized to provide a selection of colors, such as blue and red, in addition to the metallic appearance of the untreated aluminum.

When the size of the components 78 and 80, FIGURE 4, permits, the portion 72b of the tube 72 may be collapsed with respect to the neutral axis X—X to the extent the size of the components allows. In this event, chassis 74 is still held in upright position by the non-circular conformation of the tube 72.

FIGURES 7 through 10 illustrate an alternative temple member construction. As in the previously discussed embodiment there is a temple member generally 116 which is made up of a rear temple portion 120 and a forward temple section 172. The rear temple portion 120 is hollow and has a cover plate 128 held in place by screws 130. The rear temple portion 120 has a projecting stud 166 which is received within the hollow interior of the forward temple section 172. The forward temple section 172 has an inner flattened side 172a and an outer semi-circular side 172b. Similarly stud 166 has an inner flattened side 166a and an outer semi-circular side 166b. The cross-sectional configuration of stud 166 corresponds to that of the interior of the open end of forward temple section 172. Thus stud 166 is slideably received within the cavity at the rearward end of the forward temple section 172. Within the forward temple section 172 is a panel 174 holding the amplifier components described in connection with the previous embodiment.

The previously discussed parts of the alternative embodiment of FIGURES 7–10 generally correspond to the structures described in FIGURES 1–6 and in each instance corresponding numbers have been used with 100 being added to the numbers for the parts of FIGURES 7–10. With respect to the numbers of the 200 series hereinafter discussed there is no correspondence between those numbers and the numbers of FIGURES 1–6.

Along the flattened side 166a of stud 166 is a groove 201. Cover plate 128 has a tongue 202 which is received in groove 201. Along the inner wall of flat side 172a of the forward temple section 172 is a recessed guide 203 which is formed by a depression 204 in the wall 172a. When the forward temple section 172 is slipped on to stud 166 guide 203 slides into groove 201 and overlies tongue 202. This provides a frictional fit to hold the forward temple section 172 on the rear section 120. At the same time tongue 202 under guide 203 aids in locking the cover plate 128 in place on the rear section 120.

On the end of panel 174 and forming a part thereof is an abutment 206 which is shaped to fit within the cavity in forward temple section 172. Extending through abutment 206 are a plurality of metallic pins 207. Extending through stud 166 are a plurality of correspondingly positioned metallic sockets 208. The amplifier components within the forward temple section 172 are connected to pins 207 while the components within the rear portion 120 are connected to sockets 208. Thus the pins and sockets 207 and 208, respectively, serve the same function as the wires 85 described in connection with the embodiment of FIGURES 1–6. The number of pins and sockets of course will depend upon the number of electrical connections needed between the sets of components in the two portions 120 and 172. When the forward temple section 172 is slid onto stud 166 pins 207 will slide into sockets 208 to complete the electrical connection between the two sets of components. Thus the structure of the stud 166 as described and the structure of abutment 206 with the pins 207 form a plug and socket connection. It will be apparent that such a plug and socket connection could be utilized in the structure of FIGURES 1–6 or that wires 85 through an opening such as 68 could be utilized with the structure of FIGURES 7–10.

While I have shown and described a specific embodiment of the present invention it will, of course, be understood that various modifications and alternative constructions may be made without departing from the true spirit and scope of the invention. I therefore intend by the appended claims to cover all such modifications and alternative constructions as fall within their true spirit and scope.

What I claim as new and desire to secure by Letters Patent is:

1. A temple unit of selectable length for use in an eyeglass hearing aid, comprising in combination: a rear part adapted to fit over the ear and to embrace the head of the wearer, the rear part having a cavity with a sound receiving opening extending outboard the head of the wearer and a sound output opening facing downwardly; a microphone in said cavity in registration with the sound receiving opening to respond to sounds impinging on the head of the wearer; a receiver in registration with the sound output opening to deliver amplified sound to the ear of the wearer; an elongated tubular forward section having a hollow interior portion secured to and extending forwardly from the rear part, the rear part defining a bore extending from the interior of said section to said cavity; an elongated chassis slideably received in said forward section, said chassis carrying hearing aid amplifier parts and having wiring connections extending towards the rear part and through said bore connecting said parts to the microphone and receiver to define a hearing aid; and an extension member of selectable length removably secured to the forward section and at its forward end being adapted to receive the hinge part of the front of an eyeglass frame.

2. A temple unit of selectable length for use in an eyeglass hearing aid, comprising in combination: a rear part adapted to fit over the ear and to embrace the head of the wearer, the rear part having a cavity with a sound receiving opening extending outboard the head of the wearer and a sound output opening facing downwardly; a microphone in said cavity in registration with the sound receiving opening to respond to sounds impinging on the head of the wearer; a receiver in registration with the sound output opening to deliver amplified sound to the ear of the wearer; an elongated tubular forward section having a hollow interior portion secured to and extending forwardly from the rear part, the rear part defining a bore extending from the interior of said section to said cavity, the forward section having a cross-section of generally semi-circular contour outboard a neutral axis and of generally flattened contour inboard a neutral axis; an elongated chassis received in said forward section substantially along said neutral axis, said chassis carrying hearing aid amplifier parts disposed outboard said neutral axis; means including wires extending through said bore connecting said parts to the microphone and receiver to define a hearing aid; and an extension member of selectable length removably secured to the forward section and at its forward end being adapted to receive the hinge part of the front of an eyeglass frame.

3. A temple unit for an eyeglass hearing aid, comprising in combination: a rear part adapted to fit over the ear and to embrace the head of the wearer, the rear part having a cavity with a sound receiving opening extending outboard the head of the wearer and a sound output opening facing downwardly; a microphone in said cavity in registration with the sound receiving opening to respond to sounds impinging on the head of the wearer; a receiver in registration with the sound output opening to deliver amplified sound to the ear of the user; an elongated tubular forward section having a hollow interior portion secured to and extending forwardly from the rear part, the rear part defining a bore extending from the interior of said section to said cavity, the forward section having a cross-section of generally semi-circular contour outboard a neutral axis and of generally flattened contour inboard the neutral axis; an elongated chassis received in said forward section substantially along said neutral axis, said chassis carrying hearing aid amplifier parts disposed outboard said neutral axis; and, means including wires extending through said bore connecting said parts to the microphone and receiver to define a hearing aid.

4. A temple unit for an eyeglass hearing aid, comprising in combination: a rear part adapted to fit over the ear and embrace the head of the wearer, the rear part having a cavity with a sound receiving opening extending outboard the head of the wearer and a sound output opening facing downwardly; a microphone in said cavity in registration with the sound receiving opening to respond to sounds impinging on the head of the wearer; a receiver in registration with the sound output opening to deliver amplified sound to the ear of the user; a battery-receiving drawer normally extending within said cavity and withdrawable upwardly from said rear part; an elongated tubular forward section having a hollow interior portion secured to and extending forwardly from the rear part and telescopically received thereon, the rear part defining a bore extending from the interior of said section to said cavity, the forward section having a generally flattened contour inboard a neutral axis; an elongated chassis received in said forward section substantially along said neutral axis, said chassis carrying hearing aid amplifier parts disposed outboard said neutral axis; and, means including wires extending through said bore connecting said parts to the microphone and receiver to define a hearing aid.

5. A temple unit for an eyeglass hearing aid, comprising in combination: a rear part adapted to fit over the ear and embrace the head of the wearer, the rear part having a cavity with a sound receiving opening extending outboard of the head of the wearer and a sound output opening facing downwardly; a microphone in said cavity in registration with the sound receiving opening to respond to sounds impinging on the head of the wearer; a receiver in registration with the sound output opening to deliver amplified sound to the ear of the user; a battery receiving drawer normally disposed within said cavity and withdrawable upwardly from said rear part; an elongated tubular forward section having a hollow interior portion secured to and extending forwardly from the rear part and telescopically received thereon, the rear part defining a bore extending from the interior of said section to said cavity, the forward section having a cross-section of generally flattened contour inboard a neutral axis; an elongated chassis snugly received in said forward section substantially along said neutral axis, said chassis carrying hearing aid amplifier parts disposed outboard said neutral axis; means including wires extending through said bore connecting said parts to the microphone and receiver to define a hearing aid; and an extension member of selectable length telescopically received in and removably secured to the forward section and at its forward end having means adapted to receive the hinge part of the front of an eyeglass frame.

6. A temple unit for an eyeglass hearing aid adapted to be connected to the eyeglass frame, said unit comprising in combination: an extension piece having one end thereof connected to said frame; an elongated forward member releasably attached to the other end of said extension piece; a rear member releasably attached to the other end of said forward member by a stud and socket connection; said stud and socket connection being formed by a stud on one of said members and a mating socket on the other of said members; hearing aid components including a battery, a microphone, a receiver, and an amplifier; each of said members having an internal opening therein with a portion of said components being in each of the openings of the members, respectively, and electrical connections between said components passing through said stud and socket connection, whereby said components may be separated for servicing by releasing said stud and socket connection; all of said components positioned within said members to the end that the size of said unit may be adjusted to fit the wearer by changing the extension piece only.

7. A temple unit for an eyeglass hearing aid adapted to be connected to the eyeglass frame, said unit comprising in combination: a rear member; a forward member; and an extension piece; said rear member having a cavity therein; hearing aid components including a microphone; a receiver and a battery positioned within said cavity; said forward member being generally tubular with a longitudinal opening therein; amplifier components positioned within said opening; a stud and socket connection between said members, said connection being formed by a stud on one of said members and a mating socket on the other of said members; electrical connections between said components passing through said stud and socket connection; said extension piece being attached to said forward member at the end thereof opposite said stud and socket connection; all of the hearing aid components positioned in said members to the end that the size of said temple unit may be varied by changing only said extension piece.

8. A temple unit for an eyeglass hearing aid as set forth in claim 7 characterized by said forward member having a cross-section of generally semi-circular contour outboard a neutral axis and of generally flat contour inboard said neutral axis, an elongated chassis received in said forward member substantially along said neutral axis, said chassis carrying said amplifier components disposed outboard said neutral axis.

9. A temple unit for an eyeglass hearing aid adapted to be connected to the eyeglass frame, said unit comprising in combination: an extension piece having one end thereof connected to said frame; an elongated forward member releasably attached to the other end of said extension piece; a rear member releasably attached to the other end of said forward member by a stud and socket connection; said stud and socket connection being formed by a stud on one of said members and a mating socket on the other of said members, said stud and socket connection including a projecting guide on one of said members and a correspondingly positioned groove on the other of said members which guide and groove fit together to align and frictionally engage said two members; hearing aid components including a battery, a microphone, a receiver and an amplifier; each of said members having an internal opening therein with a portion of said components being in each of the openings of the members, respectively; and electrical connections between said components passing through said stud and socket connection, whereby said components may be separated for servicing by releasing said stud and socket connection; all of said components positioned within said members to the end that the size of said unit may be adjusted to fit the wearer by changing the extension piece only.

10. A temple unit of selectable length for use in an eyeglass hearing aid, comprising in combination: a hearing aid housing adapted to fit over the ear and to embrace the head of the wearer, said housing having a cavity with a sound receiving opening extending outboard the head of the wearer and further having a sound output opening facing downwardly; a microphone in said cavity in registration with the sound receiving opening to respond to sounds impinging on the head of the wearer; a receiver in registration with the sound output opening to deliver amplified sound to the ear of the wearer, said housing including an elongated forward section of reduced cross-sectional area, an elongated chassis received in said forward section, said chassis carrying hearing aid amplifier parts and having wiring connections extending towards the rear of said housing connecting said parts to the microphone and receiver to define a hearing aid; an extension member of selectable length removably secured at one end thereof to the forward section of said housing and being adapted at the other end thereof to receive the hinge part of the front of an eyeglass frame for enabling the overall length of the temple unit to be adjusted to fit the head of the wearer by merely selecting an extension member of the proper length and connecting the same between the eyeglass front frame and the hearing aid housing.

11. A temple unit for an eyeglass hearing aid adapted to be connected to the eyeglass frame, said unit comprising in combination: an extension piece having one end thereof connected to said frame; an elongated hearing aid housing releasably attached to the other end of said extension piece and adapted to fit over the ear and embrace the head of the wearer, said hearing aid housing having cavity portions for receiving hearing aid components including a battery, a microphone, a receiver, and an amplifier, respectively, and electrical connections for said components passing between said cavity portion, all of said components positioned within said hearing aid housing for enabling the size of said unit to be adjusted to fit the head of the wearer by changing only the length of the extension piece.

12. A temple unit for an eyeglass hearing aid adapted to be connected to the eyeglass frame, said unit comprising in combination: a hearing aid housing having a completely self-contained hearing aid unit positioned therewithin, said housing being formed with front and rear cavity portions, and being adapted to fit over the ear and embrace the head of the wearer, hearing aid components including a microphone, a battery, and a power switch positioned within said rear cavity portion a sound receiving opening in said rear cavity portion extending outboard the head of the wearer in registration with the microphone to respond to sounds impinging on the head of the wearer, said front cavity portion having a cross-sectional area generally smaller than the cross-sectional area of said rear cavity portion, an elongated chassis carrying hearing aid amplifier parts within said front cavity portion, a sound output opening facing downwardly from said housing and a receiver in said housing in registration with the sound output opening to deliver amplified sound to the ear of the wearer, wiring connections extending between said front and rear cavity portions and connecting said amplifier parts to the microphone, receiver, power switch and battery to define a self-contained hearing aid, and an extension member of selectable length removably secured at its back end to the front cavity portion of the hearing aid housing and at its front end being adapted to be connected to the hinge part at the front of the eyeglass frame therefor all of the hearing aid components positioned in said housing to the end that the overall length of the temple unit may be varied by changing only said extension member.

References Cited in the file of this patent
UNITED STATES PATENTS

| | | |
|---|---|---|
| 2,794,085 | De Angelis | May 28, 1957 |
| 2,797,617 | Ring | July 2, 1957 |
| 2,830,132 | Borg | Apr. 8, 1958 |
| 2,856,466 | Gustafson | Oct. 14, 1958 |
| 2,896,024 | Toomey | July 21, 1959 |

OTHER REFERENCES

Publication "Telex 960," form 502,025; Dec. 4, 1956.

PO-1050
(5/69)

UNITED STATES PATENT OFFICE
CERTIFICATE OF CORRECTION

Patent No. 3,014,994      Dated December 26, 1961

Inventor(s) Sam Posen

It is certified that error appears in the above-identified patent and that said Letters Patent are hereby corrected as shown below:

In the heading to the specification, column 1, line 5, delete "Filed" and substitute therefor -- Continuation-in-part of abandoned application Serial No. 638,726 filed February 7, 1957. This application --.

Signed and sealed this 23rd day of April 1974.

(SEAL)
Attest:

EDWARD M. FLETCHER, JR.
Attesting Officer

C. MARSHALL DANN
Commissioner of Patents